(12) United States Patent
Ma et al.

(10) Patent No.: US 12,627,813 B2
(45) Date of Patent: May 12, 2026

(54) RESIDUAL CODING METHOD AND DEVICE, VIDEO CODING METHOD AND DEVICE, AND STORAGE MEDIUM

(71) Applicant: GUANGDONG OPPO MOBILE TELECOMMUNICATIONS CORP., LTD., Dongguan (CN)

(72) Inventors: Zhan Ma, Dongguan (CN); Qi Xia, Dongguan (CN); Haojie Liu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 127 days.

(21) Appl. No.: 18/380,414

(22) Filed: Oct. 16, 2023

(65) Prior Publication Data

US 2024/0064309 A1 Feb. 22, 2024

Related U.S. Application Data

(63) Continuation of application No. PCT/CN2021/087916, filed on Apr. 16, 2021.

(51) Int. Cl.
H04N 19/159 (2014.01)
G06T 5/30 (2006.01)
(Continued)

(52) U.S. Cl.
CPC ............. H04N 19/159 (2014.11); G06T 5/30 (2013.01); G06T 7/194 (2017.01); G06V 10/761 (2022.01); G06V 10/771 (2022.01)

(58) Field of Classification Search
CPC ......... H04N 19/159; G06T 7/194; G06T 5/30; G06V 10/771; G06V 10/761
See application file for complete search history.

(56) References Cited

U.S. PATENT DOCUMENTS 9,667,980 B2 5/2017 Wang
2004/0208350 A1* 10/2004 Rea .................... G01N 21/6452
382/128
(Continued)

FOREIGN PATENT DOCUMENTS

CN 101009835 A 8/2007
CN 101193304 A 6/2008
(Continued)

OTHER PUBLICATIONS

Wu L, Huang K, Shen H, et al., Foreground-backgroundParallelC ompressionwithResidualEncodingforSurveillanceideo[J]. IEEETra nsactionsonCircuitsandSystemsforVideoTechnology,2020 (Year: 2020).*
(Continued)

*Primary Examiner* — Jonathan R Messmore
(74) *Attorney, Agent, or Firm* — BAYES PLLC

(57) ABSTRACT

A residual coding method is provided. The method comprises: when the current frame is an inter-frame prediction frame, determining whether a residual of a background region in the current frame needs to be compensated for; and when the residual of the background region in the current frame needs to be compensated for, coding first residual data, and when the residual of the background region in the current frame does not need to be compensated for, coding second residual data, wherein the first residual data is residual data of an entire image of the current frame, and the second residual data is residual data of a target region in the current frame. The present disclosure further provides a video coding method using the residual coding method, and corresponding devices and a storage medium.

20 Claims, 14 Drawing Sheets

(51) Int. Cl.
　　 *G06T 7/194* 　　　(2017.01)
　　 *G06V 10/74* 　　　(2022.01)
　　 *G06V 10/771* 　　(2022.01)

(56) References Cited

U.S. PATENT DOCUMENTS

| | | | | |
|---|---|---|---|---|
| 2007/0147690 A1* | 6/2007 | Ishiwata | ............... | H04N 19/20 |
| | | | | 375/E7.076 |
| 2013/0170557 A1* | 7/2013 | Wang | ................... | H04N 19/174 |
| | | | | 375/240.24 |
| 2013/0195178 A1* | 8/2013 | Price | .................... | H04N 19/115 |
| | | | | 375/E7.076 |
| 2014/0079321 A1* | 3/2014 | Huynh-Thu | ........... | G06V 20/40 |
| | | | | 382/203 |
| 2019/0080456 A1* | 3/2019 | Song | ........................ | G06T 7/174 |
| 2021/0258586 A1* | 8/2021 | Francois | .............. | H04N 19/186 |

FOREIGN PATENT DOCUMENTS

| | | |
|---|---|---|
| CN | 104053009 A | 9/2014 |
| CN | 112150502 A | 12/2020 |

OTHER PUBLICATIONS

International Search Report in the international application No. PCT/CN2021/087916, mailed on Jan. 5, 2022. 5 pages with English translation.

Written Opinion of the International Search Authority in the international application No. PCT/CN2021/087916, mailed on Jan. 5, 2022. 8 pages with English translation.

Liu H, Lu M, Ma Z, et al. Neural Video Coding using Multiscale Motion Compensation and Spatiotemporal Context Model[J]. IEEE Transactions on Circuits and Systems for Video Technology, 2020. the whole document. 14 pages.

Wu L, Huang K, Shen H, et al. Foreground-background Parallel Compression with Residual Encoding for Surveillance Video[J]. IEEE Transactions on Circuits and Systems for Video Technology, 2020. the whole document. 14 pages.

Xia Q, Liu H, Ma Z. Object-Based Image Coding: A Learning-Driven Revisit[C]//2020 IEEE International Conference on Multimedia and Expo (ICME). IEEE, 2020: 1-6. the whole document. 6 pages.

Supplementary European Search Report in the European application No. 21936485.8, mailed on Jan. 17, 2025, 11 pages.

\* cited by examiner

110

In response
to that a current picture
is an inter predicted picture, determining
whether a residual of a background area in the
current picture needs to be
compensated

YES

NO

120

Encoding first residual data

130

Encoding second residual data

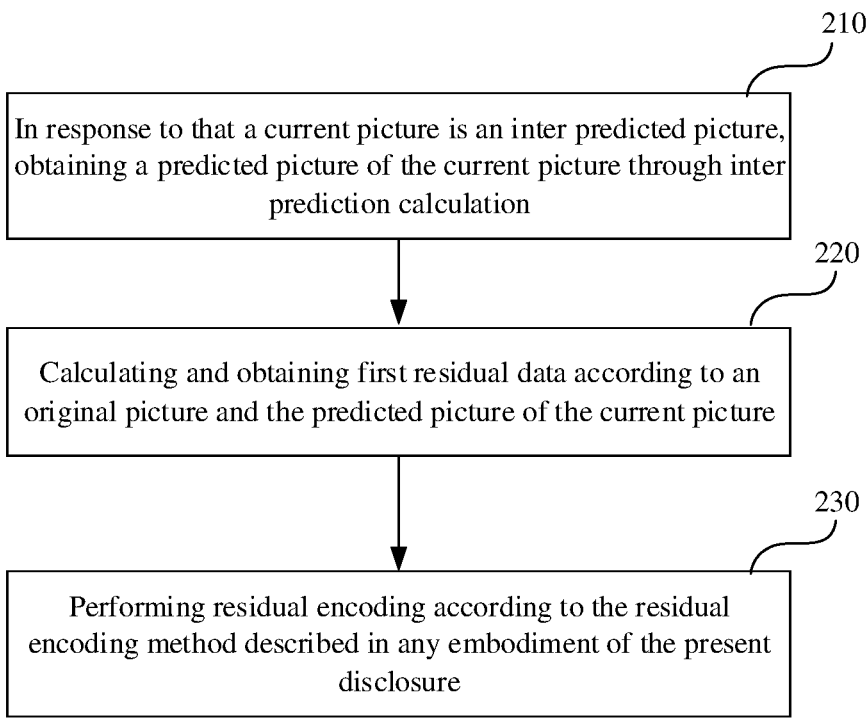

210

In response to that a current picture is an inter predicted picture, obtaining a predicted picture of the current picture through inter prediction calculation

220

Calculating and obtaining first residual data according to an original picture and the predicted picture of the current picture

230

Performing residual encoding according to the residual encoding method described in any embodiment of the present disclosure

FIG. 5

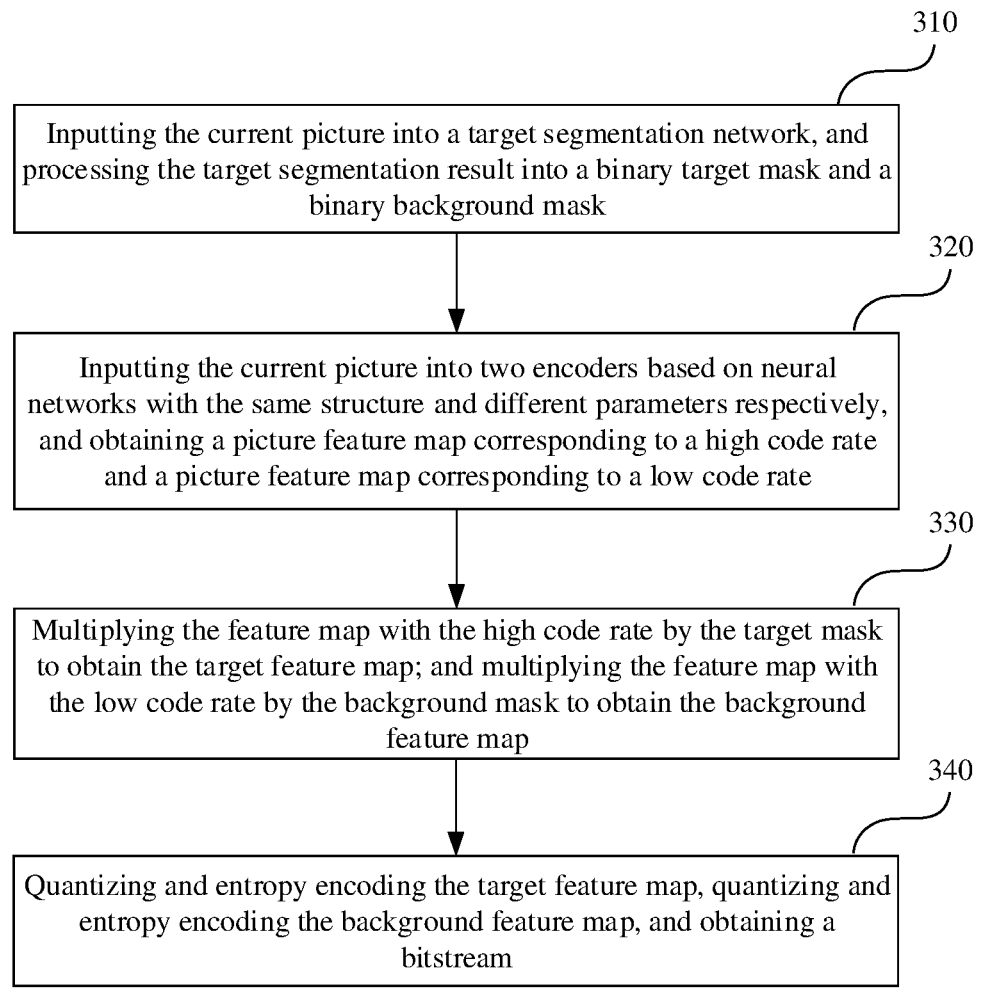

310

Inputting the current picture into a target segmentation network, and processing the target segmentation result into a binary target mask and a binary background mask

320

Inputting the current picture into two encoders based on neural networks with the same structure and different parameters respectively, and obtaining a picture feature map corresponding to a high code rate and a picture feature map corresponding to a low code rate

330

Multiplying the feature map with the high code rate by the target mask to obtain the target feature map; and multiplying the feature map with the low code rate by the background mask to obtain the background feature map

340

Quantizing and entropy encoding the target feature map, quantizing and entropy encoding the background feature map, and obtaining a bitstream

FIG. 9A

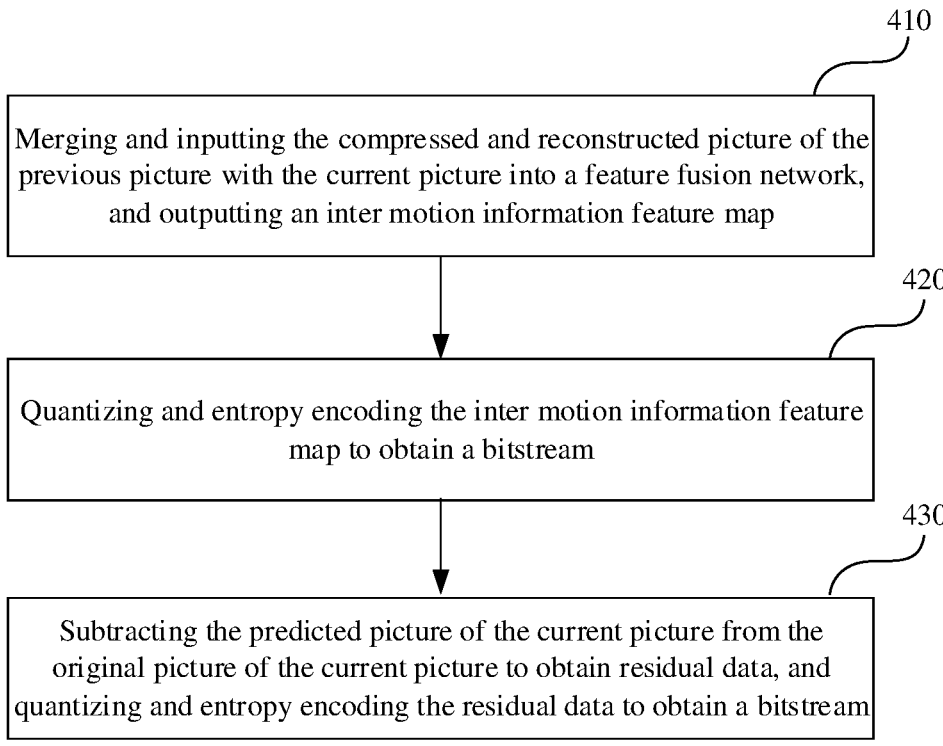

410

Merging and inputting the compressed and reconstructed picture of the previous picture with the current picture into a feature fusion network, and outputting an inter motion information feature map

420

Quantizing and entropy encoding the inter motion information feature map to obtain a bitstream

430

Subtracting the predicted picture of the current picture from the original picture of the current picture to obtain residual data, and quantizing and entropy encoding the residual data to obtain a bitstream

FIG. 9B

RESIDUAL CODING METHOD AND DEVICE, VIDEO CODING METHOD AND DEVICE, AND STORAGE MEDIUM

CROSS-REFERENCE TO RELATED APPLICATION

This is a continuation application of International Patent Application No. PCT/CN2021/087916, filed on Apr. 16, 2021, entitled "RESIDUAL CODING METHOD AND DEVICE, VIDEO CODING METHOD AND DEVICE, AND STORAGE MEDIUM", the disclosure of which is hereby incorporated by reference in its entirety.

BACKGROUND

Digital video compression technology is mainly to compress huge digital imaging video data, so as to facilitate transmission and storage. With the proliferation of videos on the Internet and the increasing demand for video definition, although existing digital video compression standards can save a lot of video data, it is still necessary to pursue better digital video compression technology to reduce a bandwidth and traffic pressure for transmitting a digital video.

SUMMARY

Embodiments of the present disclosure relate to but is not limited to video encoding and decoding technology, in particular to a coefficient encoding and decoding method, an encoding and decoding device and a storage medium. The following is a summary of subjects described in detail herein. The summary is not intended to limit the scope of protection of claims.

There is provided a residual encoding method in an embodiment of the present disclosure, which includes the following operations.

In response to that a current picture is an inter predicted picture, it is determined whether a residual of a background area in the current picture needs to be compensated; first residual data is encoded in response to that the residual of the background area in the current picture needs to be compensated, and second residual data is encoded in response to that the residual of the background area in the current picture does not need to be compensated. Herein the first residual data is residual data of a whole picture of the current picture, and the second residual data is residual data of an object area in the current picture.

There is also provided a video encoding method in an embodiment of the present disclosure.

In response to that a current picture is an inter predicted picture, a predicted picture of the current picture is obtained through inter prediction calculation;

first residual data is calculated and obtained according to an original picture and the predicted picture of the current picture; and residual encoding is performed according to the method described in any embodiment of the present disclosure.

There is also provided a residual encoding device in an embodiment of the present disclosure, including a processor and a memory storing a computer program executable by the processor. The processor is configured to implement, when running the computer program, the residual encoding method as described in any embodiment of the present disclosure.

There is also provided a video encoding device in an embodiment of the present disclosure, including a processor and a memory storing a computer program executable by the processor. The processor is configured to implement, when running the computer program, the video encoding method as described in any embodiment of the present disclosure.

After reading and understanding drawings and detailed description, other aspects can be understood.

BRIEF DESCRIPTION OF THE DRAWINGS

The drawings are used to provide an understanding of the embodiments of the present disclosure, and constitute a part of the description. The drawings, together with the embodiments of the present disclosure, serve to explain a technical solution of the present disclosure and do not constitute a limitation to the technical solution of the present disclosure.

FIG. 5 is a flowchart of a video encoding method according to an embodiment of the present disclosure.

FIG. 9A is a flowchart of encoding I frame by a video encoding method according to an embodiment of the present disclosure.

FIG. 9B is a flowchart of encoding P frame by a video encoding method according to an embodiment of the present disclosure.

DETAILED DESCRIPTION

Multiple embodiments are described in the present disclosure, but the description is exemplary and not limiting, and it will be apparent to those of ordinary skill in the art that more embodiments and implementations may be included within the scope of the embodiments described in the present disclosure.

In the present disclosure, the phase "exemplary" or "for example" are used as examples, exemplifies, or illustrations. Any embodiment described in the present disclosure as "exemplary" or "for example" should not be construed as being preferred or superior to other embodiments.

When describing representative exemplary embodiments, the method and/or process may have been rendered as a specific sequence of operations in the description. However, to the extent that the method or process does not depend on the specific order of the operations described herein, the method or process should not be limited to the specific order of operations. As will be understood by those of ordinary skill in the art, other orders of operations are also possible. Accordingly, the specific order of the operations set forth in the description should not be construed as limiting the claims. Furthermore, the claims for the method and/or process should not be limited to perform the operations in the written order. It may be readily understood by those skilled in the art that these orders may vary and remain within the spirit and scope of embodiments of the present disclosure.

Video encoding and decoding standards include H.264/ Advanced Video Coding (AVC), H.265/High Efficiency Video Coding (HEVC), H.266/Versatile Video Coding (VVC) and extensions of these standards, MPEG (Moving Picture Experts Group), AOM (Alliance for Open Media), AVS (Audio Video coding Standard) or any other custom standards, etc. These standards reduce the amount of data transmitted and stored through video compression technology to achieve more efficient video encoding and decoding and transmission storage.

Video compression includes several modules, such as intra prediction (spatial domain) module and/or inter prediction (time domain) module for reducing intra-video redundancy, transformation, quantization, inverse quantization and inverse transformation module for residual information, loop filtering module and entropy encoding module for improving the quality of subjective and objective reconstruction.

Figure 1:
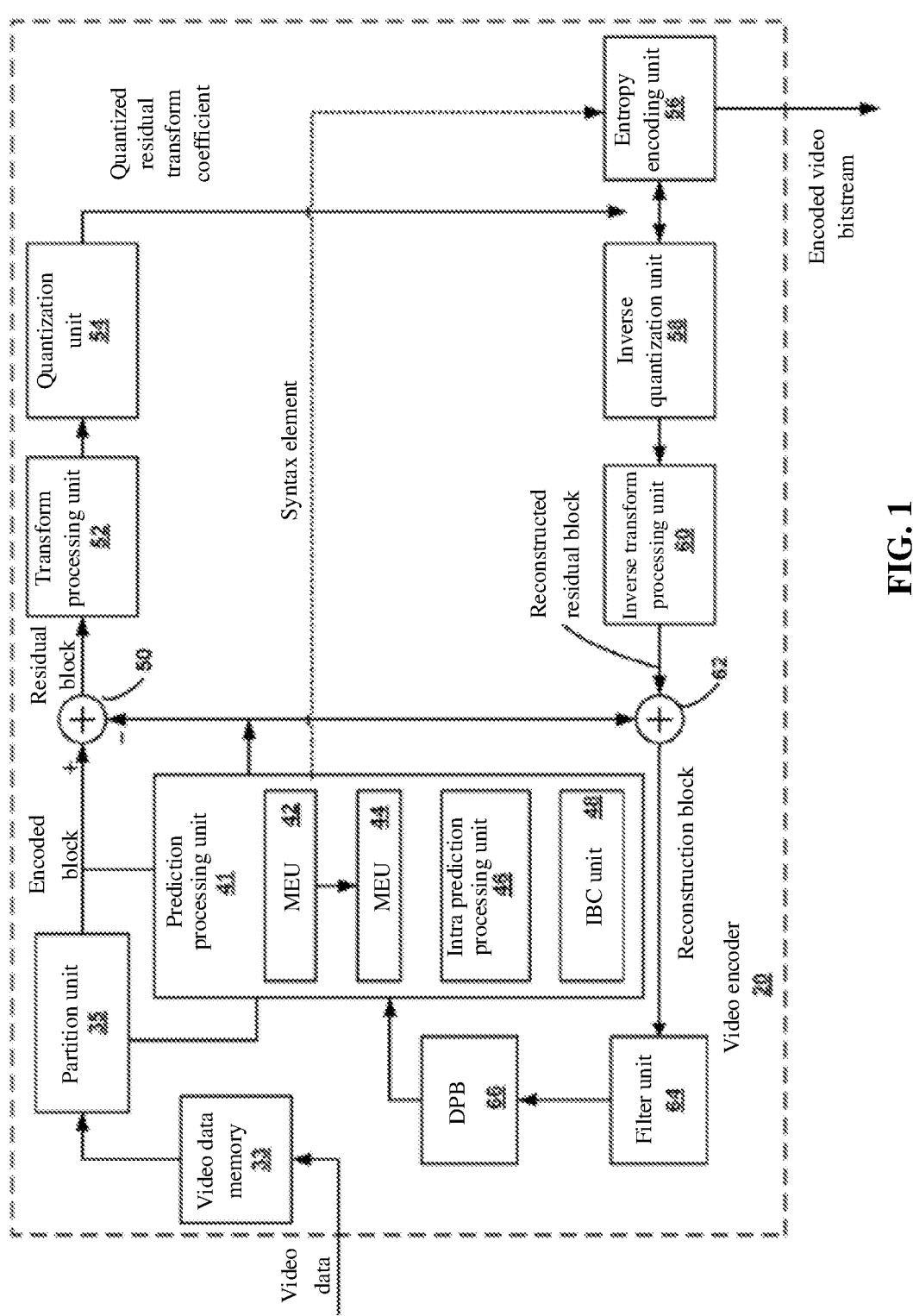
FIG. 1 is a schematic diagram of a framework of video compression encoding.

FIG. 1 is a block diagram of a structure of a video encoder 20. The video encoder 20 may perform intra prediction and inter prediction of video blocks within video slices. The intra prediction relies on spatial prediction to reduce or remove spatial redundancy in video within a given picture or video picture. The inter prediction relies on temporal prediction to reduce or remove temporal redundancy of video within adjacent frames or pictures of a video sequence. Intra mode (I mode) refers to space-based compression mode. Inter mode (e.g. unidirectional prediction (P mode) or bidirectional prediction (B mode)) refers to a time-based compression mode.

In the example illustrated in FIG. 1, the video encoder 20 includes a video data memory 33, a partition unit 35, a prediction processing unit 41, a residual generation unit 50, a transform processing unit 52, a quantization unit 54 and an entropy encoding unit 56. The prediction processing unit 41 includes a motion estimation unit (MEU) 42, a motion compensation unit (MCU) 44, an intra prediction processing unit 46, and an intra block copy (IBC) unit 48. Although illustrated separately in FIG. 1 for ease of illustration, it should be understood that the MEU 42, the MCU 44, the intra prediction processing unit 46 and the IBC Unit 48 may be highly integrated actually. For video block reconstruction, the video encoder 20 further includes an inverse quantization unit 58, an inverse transform processing unit 60, a reconstruction unit 62, a filter unit 64, and a decoded picture buffer (DPB) 66.

As illustrated in FIG. 1, the video encoder 20 receives video data and stores the received video data in the video data memory 33. The video data memory 33 may store video data to be encoded by components of the video encoder 20. For example, video data stored in the video data memory 33 is obtained from a video source. The partition unit 35 retrieves video data from the video data memory 33 and segments the video data into video blocks in conjunction with the prediction processing unit 41. This segmentation may also include segmenting into slices, blocks, or other larger units. The partition unit 35 may also divide the inputted video picture into two parts including a video object and a background by using an picture segmentation algorithm, and binarization processing may be further performed on the picture area where the video object is located to obtain an object mask, and binarization processing is performed on the picture area where the background is located to obtain a background mask. The picture area where the video object is located is called the object area, and the picture area where the background is located is called the background area herein.

The prediction processing unit 41 may select one of a plurality of possible encoding modes (e.g. one of a plurality of intra prediction modes or one of a plurality of inter prediction modes) based on an error result (e.g. encoding rate and distortion level) for the current encoded block. The intra prediction processing unit 46 may perform intra prediction encoding to provide spatial compression. The MEU 42 and MCU 44 perform inter prediction encoding to provide time compression, where the MEU 42 performs motion estimation to generate motion vectors. The IBC unit 48 may generate a two-dimensional vector and extract a prediction block, where the prediction block is in the same picture as the current encoded block. After the prediction processing unit 41 generates a prediction block for a current encoded block via intra prediction, inter prediction, or IBC, the video encoder 20 forms a residual block by subtracting the prediction block from the current video block, and the residual generation unit 50 is configured to perform the subtraction operation. Therefore, the video encoder 20 may calculate to obtain residual data corresponding to the current encoded block according to the original picture of the current picture and the predicted picture of the current picture.

When encoding the residual data (i.e. residual encoding), transformation, quantization and entropy encoding may be performed. The residual data may be applied to the transform processing unit 52. The transform processing unit 52 transforms the residual data into residual transform coefficients by using, for example, discrete cosine transform (DCT) or similar transforms. The transform processing unit 52 may transform the residual data from a pixel domain to a transform domain (e.g. a frequency domain). The transform processing unit 52 may transmit the resulting transform coefficients to the quantization unit 54. The quantization unit 54 quantizes the transform coefficients to further reduce the code rate. The quantization process may reduce a bit depth associated with some or all of the coefficients. The quantization degree may be modified by adjusting quantization parameters. In some examples, the quantization unit 54 may perform scanning of a matrix containing quantized transform coefficients. Optionally, the entropy encoding unit 56 may perform the scanning. After quantization, the entropy encoding unit 56 performs entropy encoding on the quantized transform coefficients. For example, the entropy encoding unit 56 may perform entropy encoding methods such as context adaptive variable length coding (CAVLC) and context-based adaptive binary arithmetic coding (CA-BAC). After entropy encoding is completed, the encoded bitstream may be transmitted to the video decoder 30. In entropy encoding, if many residual blocks in the residual data have zero values, the encoding may be completed with very few bits.

The inverse quantization unit 58 and inverse transform processing unit 60 apply inverse quantization and inverse transform respectively to reconstruct residual blocks in the pixel domain for later use as reference blocks. The MCU 44 may calculate a reference block by adding the residual block to a prediction block in a reference picture in a reference picture list. The MCU 44 may also apply one or more interpolation filters to reconstruct the residual block to calculate sub-integer pixel values for motion estimation. The reconstruction unit 62 adds the reconstructed residual block to the motion compensated prediction block generated by the MCU 44 to generate a reconstructed block, thereby obtaining a reconstructed picture. The filter unit 64 filters the reconstructed blocks and stores the filtered reconstructed video blocks in the DPB 66 for use as reference blocks.

At present, when performing residual encoding on video picture, the residual data of the whole picture of the current video picture is encoded, and the compressed average code rate is relatively high, which will affect the viewing experience under the condition of the limited bandwidth. In addition, when encoding I frames, the object area with high significance and the background area with low significance are allocated the same code rate, which is a waste in the case of shortage of code rate resources.

Figure 2:
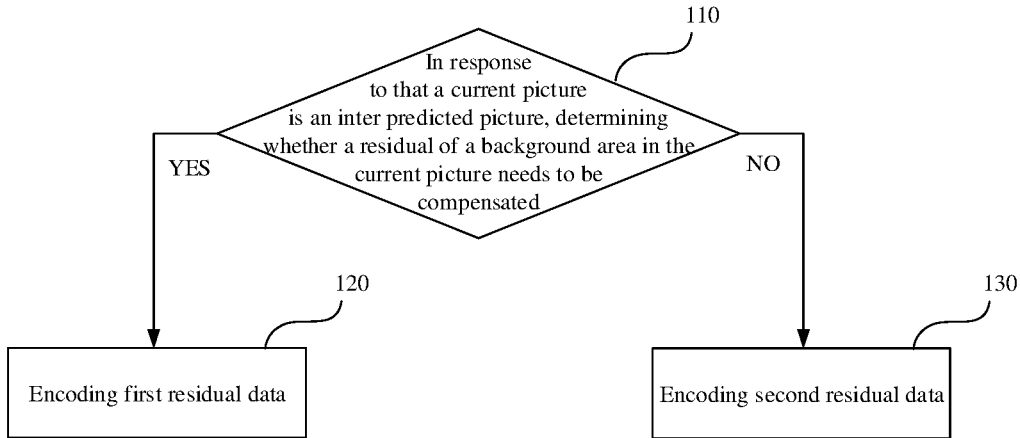
FIG. 2 is a flowchart of a residual encoding method according to an embodiment of the present disclosure.

There is provided a residual encoding method in an embodiment of the present disclosure, taking the residual encoding method in video encoding as an example. As illustrated in FIG. 2, the method includes the following operations. At operation 110, in response to that a current picture is an inter predicted picture, it is determined whether a residual of a background area in the current picture needs to be compensated; if yes, operation 120 is performed, if no, operation 130 is performed. At operation 120, first residual data is encoded in response to that the residual of the background area in the current picture needs to be compensated. At operation 130, second residual data is encoded in response to that the residual of the background area in the current picture does not need to be compensated. The first residual data is residual data of a whole picture of the current picture, and the second residual data is residual data of an object area in the current picture. Inter predicted pictures refer to other pictures except an I frame in a Group of Pictures (GOP). When the current picture is an inter predicted picture, the current picture may be a P frame or a B frame. In the embodiment, intervallic compensation is performed on residual of background, and object area residuals are compensated picture by picture. The visual quality of the object area is ensured, and the quality of the background area is slightly reduced, which can save the code rate resources and improve the subjective quality of the video.

Figure 3A:
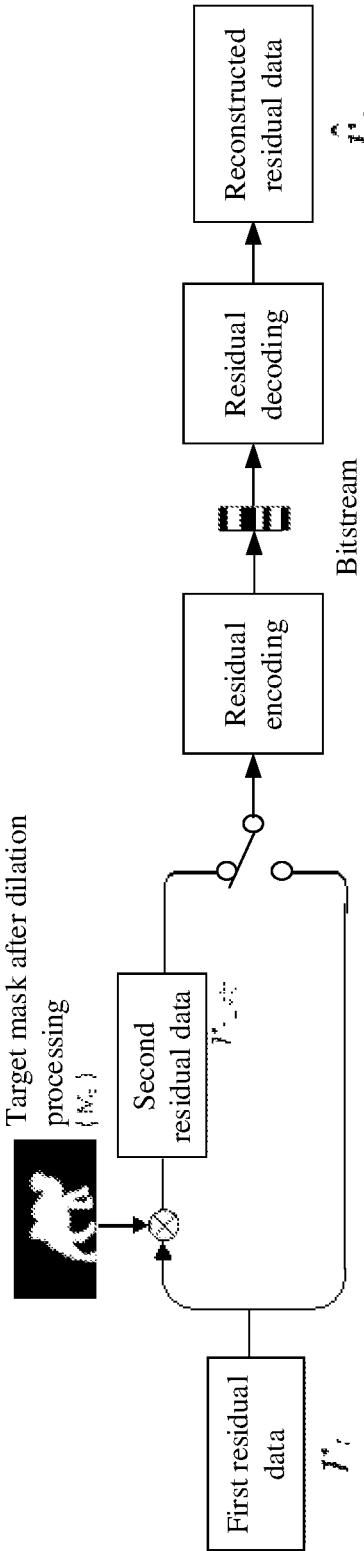
FIG. 3A is a schematic diagram of a residual encoding method according to an embodiment of the present disclosure.

FIG. 3A is a schematic diagram of the residual encoding of an embodiment of the present disclosure. It can be seen from FIG. 3A, during the residual encoding, the residual data of the whole picture of the current picture, i.e. the first residual data, may be selected to be encoded, or the residual data of the object area in the current picture, i.e. the second residual data, may be selected to be encoded. The encoding result is signalled in the bitstream, and reconstructed residual data may be obtained after the residual decoding at the decoding end. The second residual data in FIG. 3A is obtained through multiplying the first residual data by the object mask after the dilation processing. In an example, a residual processing unit may be provided separately between the residual generation unit 50 and the transform processing unit 52 in FIG. 1, to perform the determination in the above-described operation 110 and a related process of generating the second residual data. Alternatively, these processes may be performed by the residual generation unit 50 or the transform processing unit 52.

Figure 3B:
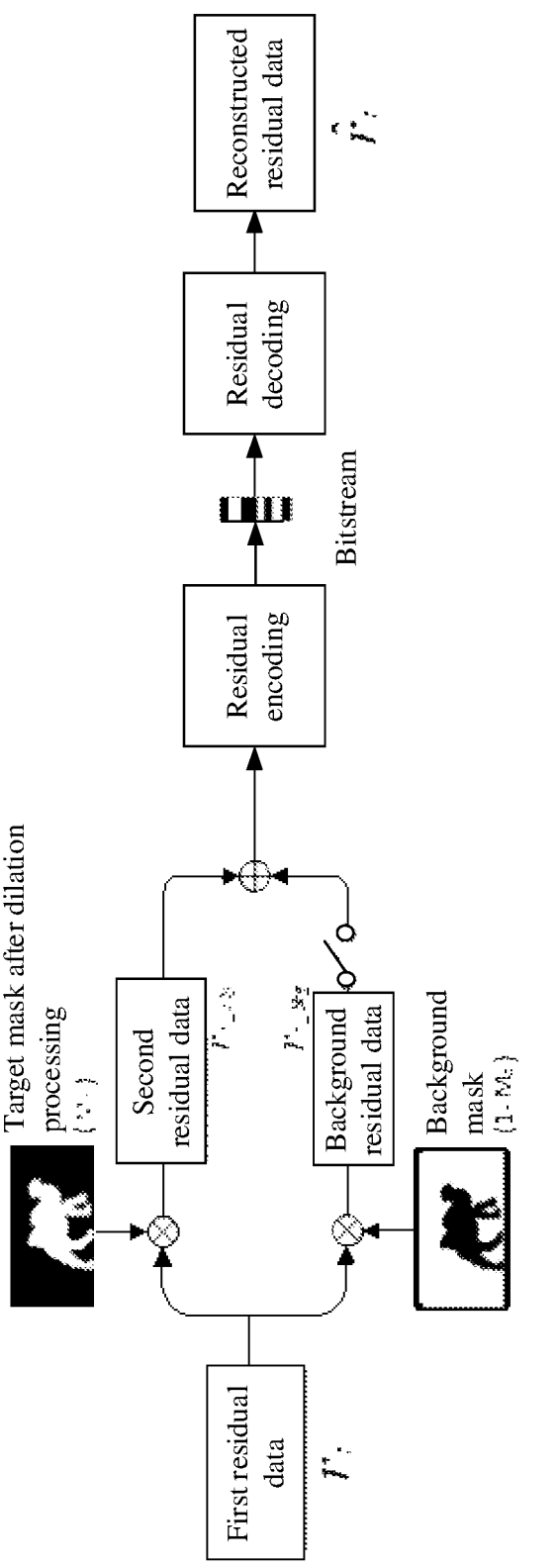
FIG. 3B is another schematic diagram of a residual encoding method according to an embodiment of the present disclosure.

FIG. 3B is a schematic diagram of residual encoding of an embodiment of the present disclosure illustrated in another manner, but FIG. 3B should not be understood as a representation of the actual processing flow of the embodiment of the present disclosure. As can be clearly seen in FIG. 3B, intervallic compensation is performed on the residual data of the background area, not all of the residual data of the background area are encoded when the residual encoding is performed in the embodiment of the present disclosure. In the embodiment of the present disclosure, the residual of the background area in the inter predicted picture is compensated selectively, which can reduce the encoding amount and improve the encoding efficiency. Because the background area is not the area that users pay attention to when watching the video, the method has little influence on the subjective quality of the video.

In the embodiment of the present disclosure, residual data of other areas, except the object area, in the current picture may be set to 0, the residual data of other areas except the object area in the current picture may be encoded, and the encoded result is signalled in the bitstream. When performing entropy encoding on the residual data after transforming and quantizing the residual data, the zero value may be represented by using an encoded non-zero flag bit of 1 bit. If the residual data of other areas except the object area are all 0, the entropy encoding of these data may be completed with a small number of bits, thus reducing the encoding amount of the residual data of the current picture. Meanwhile, a data format for residual encoding is not changed, and an original decoding method may still be used to complete decoding at the decoding end without adjustment, so the encoding method of the embodiment of the present disclosure has good compatibility for the decoding end.

In embodiments of the present disclosure, one of the following methods may be adopted to calculate residual data of an object area in a current picture. A first method is to multiply the first residual data by the first object mask to obtain the residual data of the object area in the current picture. The first object mask is obtained by inputting the original picture of the current picture into the object segmentation network and performing binarization processing on the segmentation result. This method does not perform dilation processing on the segmented object area, so the calculation is simple and easy to implement. However, due to the lack of residual compensation for the edge of the object (i.e., video object), subjective quality defects may appear at the edge of the object in the decoded picture, which may affect the video viewing effect. The second method is to multiply the first residual data by the second object mask to obtain the residual data of the object area in the current picture, the second object mask being obtained by performing dilation processing on the first object mask. This method obtains the residual data of the object area after dilation processing by calculating. Due to residual compensation for the edge of the object (i.e., video object), the above subjective quality defects can be avoided and the video viewing experience can be improved.

In the above second method, when performing the dilation processing on the first object mask, a dilation kernel used for the dilation processing is determined first, and then the dilation processing is performed on the first object mask by using the dilation kernel. The dilation kernel is also called structure element (SE) in picture morphology. The size and center point of dilation kernel may be defined according to requirements. In the embodiment, the size of the dilation kernel is positively correlated with a statistical shift value for pixels in the object area. The statistical shift value is a maximum value among shift values of all pixels in the object area, or an average value of the shift values of all pixels, etc., and the present disclosure is not limited thereto. A shift value of pixel reflects a moving speed of a picture pixel corresponding to an object between the current picture and the previous picture. In this way, the shift value of pixel in the object area is related to a size of dilation kernel. The larger the shift value of pixel, the faster the object moves. At this time, the dilation processing is performed on the first object element by selecting a larger dilation kernel can make the dilated object area larger, so as to ensure the residual compensation of the edge area of the object.

In an example based on the above second method, the used dilation kernel is a square, a side length $k_d$ of the square is calculated according to the following equation:

$$k_d = ceil(\max(D * M_O)) + k_0$$

where D is a matrix composed of shift values of pixels in the current picture, $M_O$ is the first object mask before the dilation processing, $k_0$ is a set constant, ceil( ) is a rounding up function, and max( ) is a function for taking a maximum value of elements in the matrix.

Figure 4:
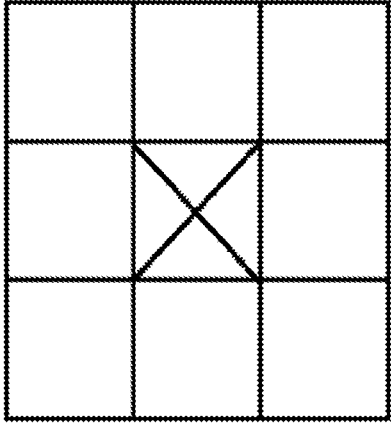
FIG. 4 is a schematic diagram of a dilation kernel used for dilation processing.

Assuming that the calculated k d=3, a dilation kernel including 3×3 pixel units as illustrated in FIG. 4 may be used. One pixel unit includes one or more pixel points, and a center point of the dilation kernel is a point with an intersecting line drawn in FIG. 4. The setting of the constant may provide a certain margin for calculation. Although the present embodiment takes a square dilation kernel as an example, the present disclosure is not limited to the shape of the dilation kernel used, for example, the shape of the dilation kernel may also be a triangle, rectangle, pentagon, hexagon, cross or other shape.

In an embodiment of the present disclosure, the operation of determining whether the residual of the background area in the current picture needs to be compensated includes that: it is determined whether the residual of the background area in the current picture needs to be compensated according to at least one of an impact factor calculated for the current picture or an impact factor calculated for an encoded inter predicted picture in a same group of pictures; herein the impact factors are determined based on a difference between a reconstructed picture with compensating the residual of the background area and a reconstructed picture without compensating the residual of the background area. That is, in the present embodiment, when selecting whether to compensate the residual of the background area in the current picture, it is considered the impact or loss to the reconstructed picture caused by not compensating the residual of the background area relative to compensating the residual of the background area. If the impact is larger (i.e., the loss is larger), the residual of the background area of more inter predicted pictures may be compensated, and if the impact is smaller (i.e., the loss is smaller), the residual of the background area of fewer inter predicted pictures may be compensated. Therefore, dynamically and adaptively selecting whether to compensate the residual in the background area is achieved, so as to achieve a reasonable balance between improving the encoding effect and improving the video quality, and achieve the optimization of performance.

In an embodiment of the present disclosure, the operation of determining whether the residual of the background area in the current picture needs to be compensated includes that:

a predicted picture of the current picture and the second residual data are added to obtain a reference picture of the current picture;

a similarity between an original picture and the reference picture of the current picture is calculated, and it is determined whether the similarity is less than a set first threshold value;

in response to that the similarity is less than the set first threshold value, it is determined that the residual of the background area in the current picture needs to be compensated;

in response to that the similarity is not less than the set first threshold value, it is determined that the residual of the background area in the current picture does not need to be compensated.

The similarity in the embodiment is a concrete expression of the "impact factor" mentioned above. Because the similarity between the original picture of the current picture and the reference picture calculated in the present embodiment may reflect the difference between a reconstructed picture with compensating the residual of the background area and a reconstructed picture without compensating the residual of the background area. In an example, the similarity may be calculated by the following equation:

$$R_{t\_index} = d\left(X_t, \hat{X}_t^p + r_t * M_o\right)$$

where $R_{t\_index}$ denotes the calculated similarity for the current picture (the t-th picture), d( ) is the multi-scale structural similarity index measure (MS-SSIM), $X_t$ is an original picture of the current picture, $$\hat{X}_t^p$$

is a predicted picture of the current picture, $r_t$ is the residual data of the whole picture, $M_o$ is the object mask after dilation processing (or without dilation processing), so $r_t*M_o$ is the second residual data, and $$\hat{X}_t^p + r_t * M_o$$

denotes a picture reconstructed only based on the residual data of the object area (referred to above as the reference picture). In addition to using MS-SSIM algorithm, structural similarity index measure (SSIM) and other picture similarity algorithms may be used.

In the embodiment, similarity calculation is performed on all inter predicted pictures, and the calculation is complicated. In another embodiment of the present disclosure, a method of similarity calculation for partial inter predicted pictures is employed. In the method, in response to that the current picture is an earliest inter predicted picture after intra-coded (I) frame (only the earliest picture in a GOP is the I frame) in a GOP, a predicted picture of the current picture is added to the second residual data to obtain a reference picture of the current picture; and a similarity calculation is performed to obtain a similarity between an original picture and the reference picture of the current picture, and a number $N_s$ of intervals between two pictures for compensating the residual of the background area is determined according to the similarity. Similarity and $N_s$ may meet the positive correlation. The positive correlation here can't be understood mechanically as $N_s$ must become larger when the similarity value becomes larger, the positive correlation also may be that $N_s$ becomes larger when the similarity value changes from an interval with smaller similarity value to an interval with larger similarity value, or other similar situations.

In the embodiment, when performing residual encoding on the inter predicted picture, the operation of determining whether the residual of the background area in the current picture needs to be compensated includes that: it is determined that the residual of the background area in the current picture needs to be compensated in response to that a number N of intervals between the current picture and a most recent inter predicted picture for compensating the residual of the background area or a number N of intervals between the current picture and a most recent I frame is equal to $N_s$. Moreover, in the embodiment, when determining to compensate the residual of the background area in the current picture, the similarity calculation may be re-performed in the next picture or the current picture, and the number $N_s$ of intervals between two pictures for compensating the residual of the background area may be re-determined according to the calculated similarity, that is, the $N_s$ is updated. Herein, both N and $N_s$ are positive integers.

When $N < N_s$, it is determined that the residual of the background area in the current picture does not need to be compensated.

For example, in an example, a group of pictures (GOP) contains 12 video pictures, the first of which is an I frame and the others are all P frames. When encoding a GOP, the encoding method for I frame can adopt the existing encoding method. Assuming that when encoding the first P frame in the GOP, the number $N_s$ of intervals is determined as 3 by using the similarity, since the number of interval between the first P frame and the most recent I frame is 1, there is no need to compensate the residual of the background area in the current picture. The number of intervals between the second P frame and the most recent I frame is 2, and there is no need to compensate the residual of the background area in the current picture. Because the number of intervals between the third P frame and the most recent I frame is 3, the residual of the background area needs to be compensated. According to the method of the embodiment, similarity calculation needs to be performed again at the fourth P frame to update the $N_s$. Assuming that the updated $N_s$=4, there is no need to compensate the residual of the background area in the fourth P frame to sixth P frame. In the seventh P frame, the residual of the background area in the current picture needs to be compensated, and $N_s$ is updated through similarity calculation at the eighth P frame, and so on until the eleventh P frame, and the encoding of the GOP is ended. Then, the next GOP is encoded in the same method.

In the above embodiment, similarity calculation is performed on the inter predicted picture for compensating the residual of the background area in the current picture, and the number $N_s$ of interval pictures is updated, which can adapt to the movement change of the object in the picture more quickly. When the similarity is higher, it is indicated that the impact (or loss) without compensating the residual of the object area is smaller, and a larger $N_s$ may be adopted at this time. When the similarity is lower, it is indicated that the impact without compensating the residual of the object area is larger, and a smaller $N_s$ can be adopted at this time. Thus, a balanced optimization effect in picture quality and encoding efficiency is achieved. The present disclosure is not limited to this, and similarity calculation and determination of $N_s$ value may be performed only on the first inter predicted picture, and the $N_s$ value may be used in the current GOP range to determine whether the residual of the background area in the current picture needs to be compensated.

In an embodiment of the present disclosure, the operation that the number $N_s$ of intervals between two pictures for compensating the residual of the background area is determined according to the similarity includes that: a similarity range to which the similarity belongs is determined; and corresponding relationships between preset similarity ranges and the number of interval pictures is searched according to the similarity range determined, and a searched number of interval pictures is taken as $N_s$, herein in the correspondences, the number of interval pictures which corresponds to a similarity range with a greater similarity in the preset similarity ranges is also larger. For example, in an example, $N_s$ is calculated according to the following equation:

$$N_s = \begin{cases} N_1, & R_{t\_index} \leq \lambda_1 \\ N_2, & \lambda_1 < R_{t\_index} < \lambda_2 \\ N_3, & R_{t\_index} \geq \lambda_2 \end{cases}$$

where $R_{t\_index}$ denotes the similarity calculated for the current picture (the t-th picture), $\lambda_1$, $\lambda_2$, $\lambda_3$ denote three set similarity threshold values, which divide out three similarity ranges. When $R_{t\_index}$ is located in different similarity ranges, $N_s$ takes different values. Here, $N1 < N2 < N3$.

However, the present disclosure is not limited to the method for calculating $N_s$ according to the similarity in the above example. For example, $N_s$ is obtained according to the similarity and a set equation, the set equation being used for calculating the number of intervals according to the similarity. The present disclosure also includes other method for calculating $N_s$.

In another embodiment of the present disclosure, different from the previous embodiment, when $N < N_s$, it is not directly determined that the residual of the background area in the current picture does not need to be compensated, but to determine whether a set residual compensation condition is satisfied. If the set residual compensation condition is satisfied, it is determined that the residual of the background area in the current picture needs to be compensated, and if the set residual compensation condition is not satisfied, it is determined that the residual of the background area in the current picture does not need to be compensated. The set residual compensation condition includes at least one of the following: a difference value obtained by subtracting a calculated similarity for the current picture from a calculated similarity for a previous picture is greater than a set second threshold value; and the calculated similarity for the current picture is less than a set third threshold value. In the embodiment, when residual encoding is performed on each inter predicted picture, similarity calculation is performed to obtain a similarity of each inter predicted picture, so as to perform the above operation. The residual compensation condition set in the embodiment can adapt to the rapid change of the object. For example, the difference value obtained by subtracting a calculated similarity for the current picture from a calculated similarity for a previous picture is greater than a set second threshold value, which indicates that the impact (or loss) of the current picture without compensating the residual of the background area becomes sharply larger. At this time, even if the originally set number of interval pictures is not reached, the residual of the background area in the current picture may be compensated to improve the picture quality. When the calculated similarity for the current picture is less than a set third threshold value, which indicates a larger impact of the current picture without compensating the residual of the background area of the current picture, so the residual of the background area in the current picture may also be compensated.

The intervallic compensation of residual of background area provided by the embodiment of the present disclosure saves code rate resources to a certain extent.

There is also provided a video encoding method in an embodiment of the present disclosure, as illustrated in FIG. 5, the method includes the following operations.

At operation 210, in response to that a current picture is an inter predicted picture, a predicted picture of the current picture is obtained through inter prediction calculation.

At operation 220, first residual data is calculated and obtained according to an original picture and the predicted picture of the current picture.

At operation 230, residual encoding is performed according to the method described in any embodiment of the present disclosure.

In an embodiment of the present disclosure, the video encoding method further includes the following operations.

In response to that the current picture is an intra-coded (I) frame, the original picture of the current picture is encoded by adopting a first code rate and a second code rate respectively to obtain an picture feature map of the first code rate and an picture feature map of the second code rate, herein the first code rate is greater than the second code rate;

the picture feature map of the first code rate is multiplied by a third object mask to obtain an object feature map;
the picture feature map of the second code rate is multiplied by a background mask to obtain a background feature map;
the object feature map and the background feature map are encoded respectively;
herein the third object mask and the background mask are obtained by inputting the original picture of the current picture into an object segmentation network and performing binarization processing on a segmentation result. The third object mask corresponds to the object area in the segmentation result (other object masks also correspond to the corresponding object area), and the background mask corresponds to the background area in the segmentation result.

In the embodiment, more code rate resources are given to the video object area, so as to improve the subjective quality of the video under the extremely low code rate.

Figure 6:
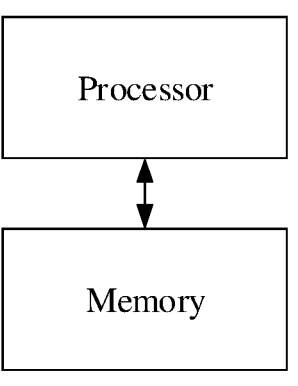
FIG. 6 is a schematic diagram of a residual encoding device according to an embodiment of the present disclosure.

There is also provided a residual encoding device in an embodiment of the present disclosure, as illustrated in FIG. 6, the device including a processor and a memory storing a computer program executable on the processor, herein the processor is configured to implement, when running the computer program, the residual encoding method as described in any embodiment of the present disclosure.

There is also provided a video encoding device in an embodiment of the present disclosure, also as illustrated in FIG. 6, the device including a processor and a memory storing a computer program executable on the processor, herein the processor is configured to implement, when running the computer program, the video encoding method as described in any embodiment of the present disclosure.

There is also provided a video encoding and decoding system in an embodiment of the present disclosure, which includes a video encoding device and a video decoding device as described in any embodiment of the present disclosure.

There is also provided a non-transitory computer-readable storage medium in an embodiment of the present disclosure, in which a computer program is stored, herein the computer program is executed by a processor to implement the residual encoding method or the video encoding method as described in any embodiment of the present disclosure.

There is also provided a bitstream in an embodiment of the present disclosure, herein the bitstream is generated according to the residual encoding method or the video encoding method according to any embodiment of the present disclosure. When the residual of the background area in the current picture needs to be compensated, the bitstream includes code words obtained by encoding the first residual data, and when the residual of the background area in the current picture does not need to be compensated, the bitstream includes code words obtained by encoding the second residual data.

Figure 7:
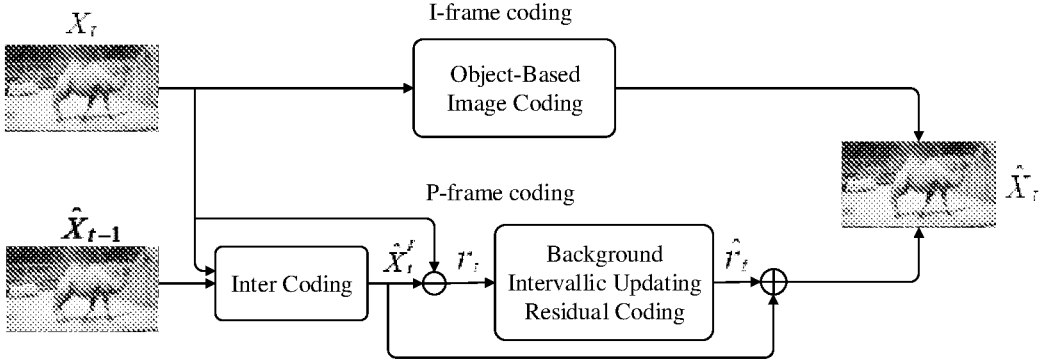
FIG. 7 is a schematic diagram of a video encoding and decoding method according to an embodiment of the present disclosure.

There is also provided an end-to-end video encoding method based on object encoding in an embodiment of the present disclosure, which improves the subjective quality of video under the condition of extremely low code rate by allocating a higher code rate to the object area and allocating a lower code rate to the background area. The schematic diagram is illustrated in FIG. 7, in which $X_t$ denotes the current picture (also called the original picture), $\hat{X}_{t-1}$ denotes the reconstructed picture of the previous picture, $$\hat{X}_t^p$$

denotes the predicted picture of the current picture, r t denotes the residual data of the whole picture, $\hat{r}_t$ denotes the reconstructed residual data after being encoded by the encoding method for performing intervallic compensation on the residual of background of the embodiment of the present disclosure, and $\tilde{X}_t$ denotes the reconstructed picture of the current picture.

When encoding the first picture (I frame) of a video series (such as a GOP), the following encoding method is adopted, as illustrated in FIG. 9A, including the following operations. At operation 310, the current picture is inputted into an object segmentation network, and the object segmentation result is processed into a binary object mask and a binary background mask. At operation 320, the picture is inputted into two encoders based on neural networks with the same structure and different parameters respectively, to obtain a picture feature map corresponding to a high code rate and a picture feature map corresponding to a low code rate. At operation 330, the feature map with the high code rate is multiplied by the object mask to obtain the object feature map; the feature map with the low code rate is multiplied by the background mask to obtain the background feature map. At operation 340, the object feature map is quantized and entropy encoded, and the background feature map is quantized and entropy encoded, to obtain a bitstream.

In the embodiment of the present disclosure, when encoding the I-frame, different code rates are adapted for the object area and the background area in the picture. Through assigning more code rate resources to the object area, the subjective quality of the video under the extremely low code rate is improved.

When encoding subsequent pictures (P frames in the embodiment) of the video sequence, as illustrated in FIG. 9B, the method includes the following operations.

At operation 410, the reconstructed picture of the previous picture and the current picture are merged and inputted into a feature fusion network, and an inter motion information feature map is outputted from the feature fusion network. In the operation, the motion information estimation network is used to calculate motion information of pixels between the current picture and the previous picture. At operation 420, the inter motion information feature map is quantized and entropy encoded to obtain a bitstream. At operation 430, the predicted picture of the current picture is subtracted from the original picture of the current picture to obtain residual data, and the residual data is quantized and entropy encoded (compression encoded) to obtain a bitstream. The encoding strategy of this operation is to encode the residual data of the object area picture by picture, and to encode the residual data of the background area in some pictures at intervals.

The operation may be divided into the following substeps.

At step 1), the picture is inputted into an object segmentation network, and the segmentation result is processed as an object mask.

At step 2), morphological dilation processing is performed on the object mask, the dilation kernel is related to the maximum shift value of the pixels in the object area, and is determined by the following equation:

$$k_d = ceil(\max(D * M_O)) + k_0$$

where a shift value of each pixel $d_i = \sqrt{u^2 + v^2}$, (u, v) is an optical flow of each pixel, and the meanings of other parameters can be seen in the same equation above.

At step 3), at the beginning of each spacing (that is, a first P frame, and a subsequent P frame whose number of intervals from the previous picture, of which the residual of the background picture is compensated, is equal to the number of interval pictures), an impact factor (i.e., the similarity above) is determined based on a reconstructed picture with compensating the residual of the background area and a reconstructed picture without compensating the residual of the background area.

$$R_{t\_index} = d\left(X_t, \hat{X}_t^p + r_t * M_o\right)$$

where d( ) is the MS-SSIM function, and the meanings of other parameters can be seen in the same equation above.

A size of interval N is determined according to an interval where the impact factor is located:

$$N = \begin{cases} N_1, R_{t\_index} \le \lambda_1 \\ N_2, \lambda_1 < R_{t\_index} < \lambda_2 \\ N_3, R_{t\_index} \ge \lambda_2 \end{cases}$$

The meanings of other parameters can be seen in the same equation above.

At step 4), in each spacing, when t<N (t is the serial number of the current picture in the current video sequence), only the residual data $r_{t\_obj} = r_t * M_d$ of the object area is encoded, $M_d$ is the object mask after the dilation operation, and the residual data $r_{t\_obj}$ of the object area is inputted to the subsequent residual encoder. When t=N, the residual $r_t$ of whole picture is inputted to the subsequent residual encoder, and N is updated.

In another example, when t<N, it is also determined whether $R_{t-1\_index} - R_{t\_index} > \lambda$ is satisfied, $\lambda$ being a set threshold value. If yes, it indicates that the residual of background have a rapid change at this time, and the residual in the background area are also compensated at this time, and the residual of whole picture is inputted into a subsequent residual encoder.

At step 5), after an spacing is ended, the above steps are repeated.

Figure 8A:
FIG. 8A is a schematic diagram of an object mask before dilation processing according to an embodiment of the present disclosure.
Figure 8B:
FIG. 8B is a schematic diagram of an object mask after performing dilation processing on the object mask of FIG. 8A.
Figure 8C:
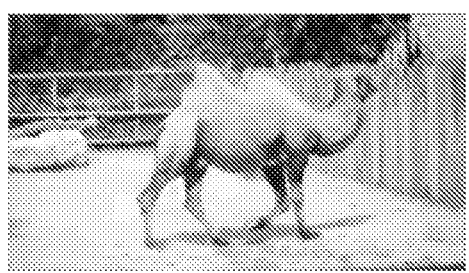
FIG. 8C is a picture obtained after processing using the object mask of FIG. 8A.
Figure 8D:
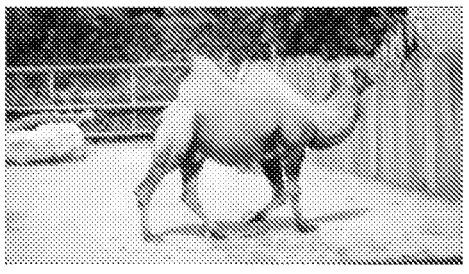
FIG. 8D is a picture obtained after processing using the object mask of FIG. 8B.

FIG. 8A is a schematic diagram of an object mask before dilation processing, FIG. 8B is a schematic diagram of an object mask after performing dilation processing on the object mask of FIG. 8A, FIG. 8C is an picture obtained after processing using the object mask of FIG. 8A, and FIG. 8D is a picture obtained after processing using the object mask of FIG. 8B. The edge of the object area in FIG. 8D is clearer.

The sample picture is encoded by using H.264, H.265, NVC and the video compression method based on object encoding of the embodiment of the present disclosure, and average code rates consumed by the tested four algorithms for compressing the sequence are illustrated in the following table:

| | H.264 | H.265 | NVC | OBVC |
|---|---|---|---|---|
| Average bpp | 0.0213 | 0.0199 | 0.0197 | 0.0175 |

In the embodiment of the present disclosure, more code rate resources are provided to the video object area, so as to improve the subjective quality of the video under the extremely low code rate. The intervallic compensation is performed on residual of background area, and the object area residual is compensated picture by picture. While ensuring the visual quality of the object area, the quality of the background area is slightly reduced, which improve the subjective quality of the video and saves the code rate resources to a certain extent. In addition, in the embodiment, dilation processing is performed on the object segmentation mask, the visual defect of the edge in the object occurring at the edge in the object caused by intervallic compensation of residual of background is solved.

Figure 11:
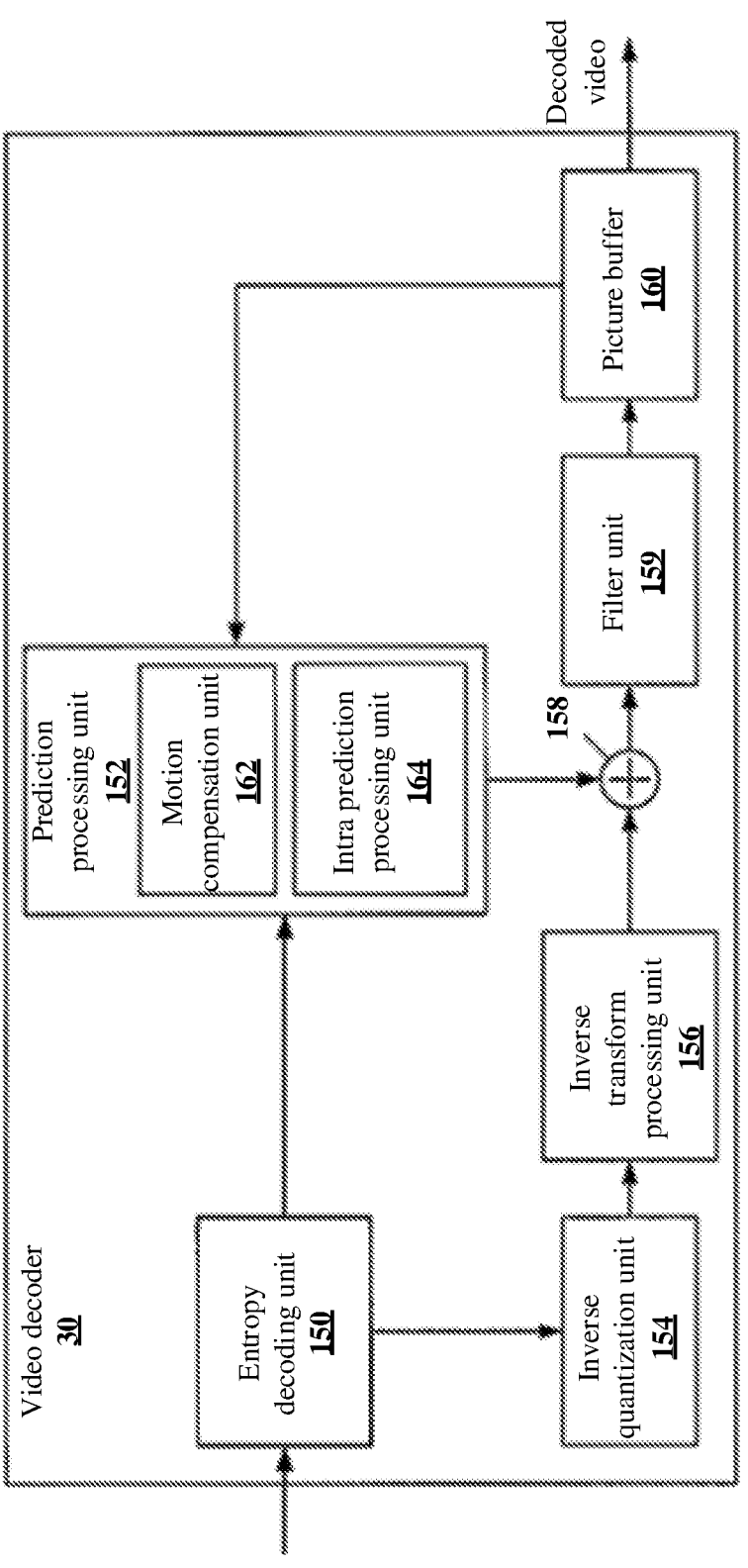
FIG. 11 is a block diagram of a structure of a video decoder according to an embodiment of the present disclosure.

FIG. 11 is a block diagram of a structure of a video decoder 30 according to an embodiment of the present disclosure. The video decoder 30 includes an entropy decoding unit 150, a prediction processing unit 152, an inverse quantization unit 154, an inverse transform processing unit 156, a reconstruction unit 158, a filter unit 159 and a picture buffer 160. The prediction processing unit 152 includes a motion compensation unit 162 and an intra prediction processing unit 164. In other embodiments, the video decoder 30 may include more, fewer or different functional components.

A video decoder 30 receives a bitstream. The entropy decoding unit 150 may parse the bitstream to extract syntax elements from the bitstream. The prediction processing unit 152, the inverse quantization unit 154, the inverse transform processing unit 156, the reconstruction unit 158 and the filter unit 159 may generate decoded video data based on syntax elements extracted from the bitstream.

As part of the parsing bitstream, the entropy decoding unit 150 may entropy decode syntax elements in the bitstream. As part of performing a reconstruction operation on a transform unit (TU) of a coding unit (CU), an inverse quantization unit 154 may perform inverse quantization on a coefficient block associated with the TU. After inverse quantization is performed on the coefficient block by the inverse quantization unit 154, the inverse transform processing unit 156 may apply one or more inverse transforms to the coefficient block to generate a residual block associated with the TU.

If the prediction unit (PU) uses intra prediction encoding, the intra prediction processing unit 164 may perform intra prediction to generate a prediction block of the PU. The intra prediction processing unit 164 may determine the intra prediction mode of the PU based on one or more syntax elements parsed from the bitstream. The motion compensation unit 162 may construct a first reference picture list (List 0) and a second reference picture list (List 1) based on syntax elements extracted from the bitstream. Further, if the PU is encoded using inter prediction, the entropy decoding unit 150 may extract motion information of the PU. The motion compensation unit 162 may determine one or more reference blocks of the PU based on motion information of the PU. The motion compensation unit 162 may generate a prediction block of the PU based on one or more reference blocks of the PU. The reconstruction unit 158 may obtain the reconstructed block of the CU using the residual block associated with the TU of the CU and the prediction block of the PU of the CU (i.e. the intra prediction data or the inter prediction data). The reconstruction unit 158 may add the residual block and the prediction block to obtain a reconstructed block of the CU. The filter unit 159 may perform a deblocking operation. The video decoder 30 may store the reconstructed block of the CU in the picture buffer 160. The picture buffer 160 may provide reference pictures for subsequent motion compensation, intra prediction and presentation on the display device.

Figure 10A:
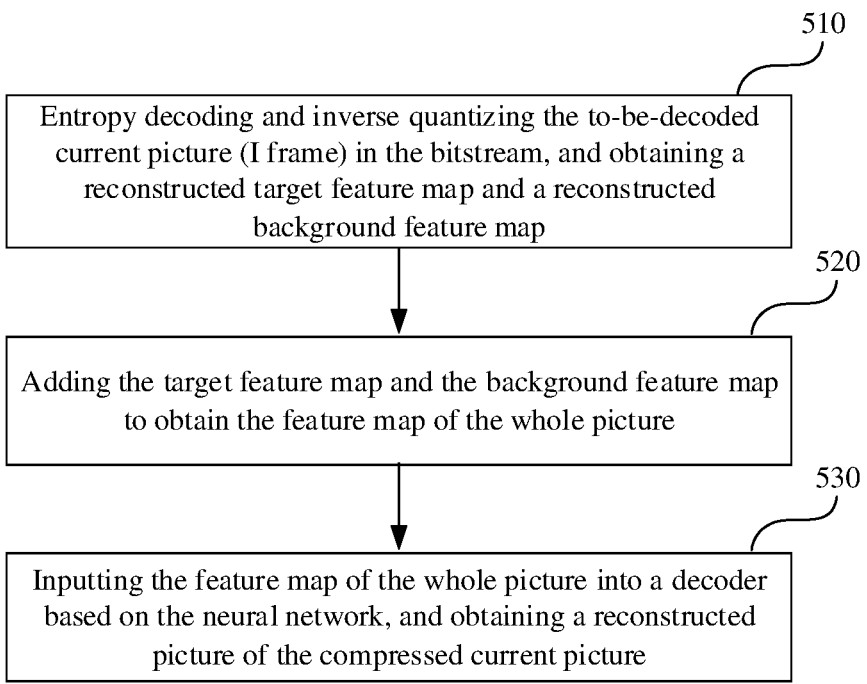
FIG. 10A is a flowchart of decoding I frame by a video decoding method according to an embodiment of the present disclosure.

When the current picture is an I frame, the decoding flow executed by the video decoding device is illustrated in FIG. 10A and includes the following operations. At operation 510, the to-be-decoded current picture (I frame) in the bitstream is entropy decoded and inverse quantizated to obtain a reconstructed object feature map and a reconstructed background feature map. At operation 520, the object feature map and the background feature map are added to obtain the feature map of the whole picture. At operation 530, the feature map of the whole picture is inputted into a decoder based on the neural network to obtain a reconstructed picture of the compressed current picture.

Figure 10B:
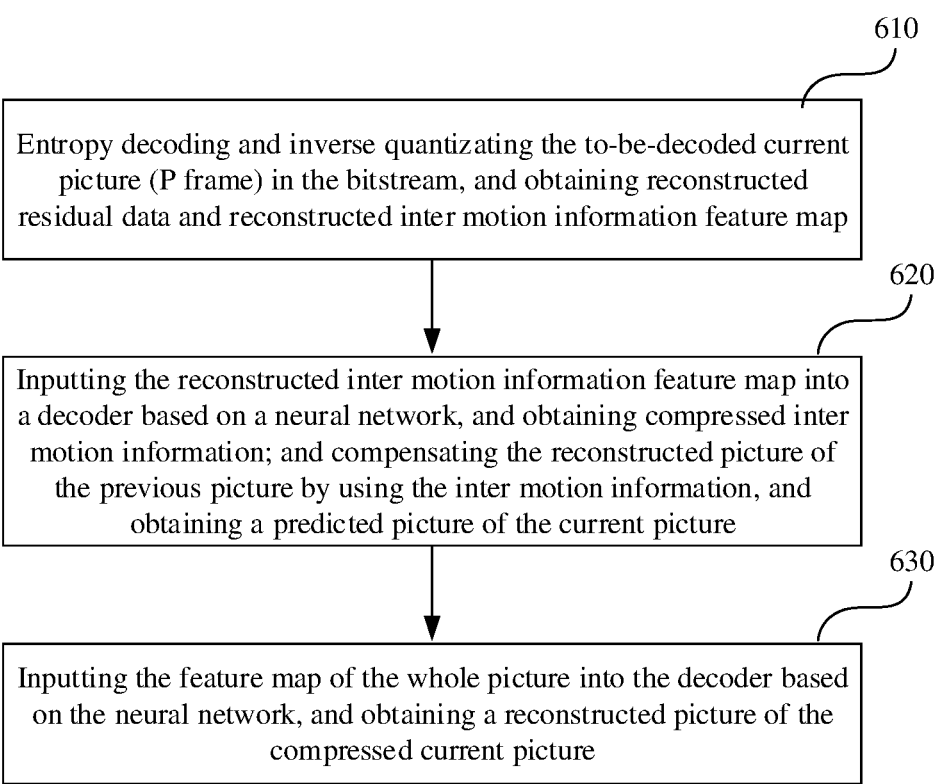
FIG. 10B is a flowchart of decoding P frame by a video decoding method according to an embodiment of the present disclosure.

When the current picture is an inter predicted picture (taking the P frame as an example, or it may be a B frame), the decoding flow executed by the video decoding device is illustrated in FIG. 10B and includes the following operations. At operation 610, the to-be-decoded current picture (P frame) in the bitstream is entropy decoded and inverse quantizated to obtain reconstructed residual data and reconstructed inter motion information feature map. In the operation, the decoding end does not need to identify whether the encoding end encodes the first residual data or the second residual data. When the encoding end encodes the second residual data (that is, the residual data of the object area in the current picture), the residual data of other area except the object area in the current picture is set to 0 and encoding is performed, the encoding format is not changed. Therefore, the decoder may decode the residual data in the same way. At operation 620, the reconstructed inter motion information feature map is inputted into a decoder based on a neural network to obtain compressed inter motion information, and the reconstructed picture of the previous picture is compensated by using the inter motion information to obtain a predicted picture of the current picture. At operation 630, the reconstructed residual data is added to the predicted picture of the current picture to obtain a reconstructed picture of the compressed current picture.

In one or more exemplary embodiments, the described functionality may be implemented in hardware, software, firmware, or any combination thereof. If implemented in software, the function may be stored on or transmitted via a computer-readable medium as one or more instructions or codes and executed by a hardware-based processing unit. The computer-readable medium may include a computer-readable storage medium corresponding to a tangible medium, such as a data storage medium, or a communication medium that includes any medium that facilitates the transfer of a computer program from one place to another, such as in accordance with a communication protocol. In this manner, the computer-readable medium may generally correspond to a non-transitory tangible computer-readable storage medium or a communication medium such as a signal or carrier wave. The data storage medium may be any available medium accessible by one or more computers or one or more processors to retrieve instructions, codes, and/or data structures for implementing the techniques described in the present disclosure. The computer program product may include a computer readable medium.

By way of example and not limitation, such computer-readable storage medium may include RAM, ROM, EEPROM, CD-ROM or other optical disk storage device, disk storage device or other magnetic storage device, flash memory, or any other medium that may be used to store desired program code in the form of instructions or data structures and that may be accessed by a computer. Furthermore, any connection may also be referred to as a computer-readable medium. For example, if coaxial cable, fiber optic cable, twisted pair, digital subscriber line (DSL), or wireless technologies such as infrared, radio, and microwave are used to transmit instructions from a Web site, server or other remote source, the coaxial cable, the fiber optic cable, the double rib, the DSL, or the wireless technologies such as infrared, radio, and microwave are included in the definition of the medium. However, it should be understood that computer-readable storage media and data storage media do not contain connections, carriers, signals, or other transitory (transitory state) medium, but are intended for non-transitory tangible storage media. As used herein, magnetic disks and optical discs include compact discs (CD), laser discs, optical discs, digital versatile discs (DVD), floppy discs or blue-ray discs, etc., where the magnetic disks generally reproduce data magnetically, while optical discs reproduce data optically using lasers. The above combination should also be included in the scope of computer readable medium.

The instructions may be executed by one or more processors, such as one or more digital signal processors (DSP), general purpose microprocessors, application specific integrated circuit (ASIC), field programmable logic arrays (FPGA), or other equivalent integrated or discrete logic circuits. Thus, the term "processor" as used herein may refer to any of the above-described architectures or any other architectures suitable for implementing the techniques described herein. Additionally, in some aspects, the functionality described herein may be provided within dedicated hardware and/or software modules configured for encoding and decoding or incorporated in a combined codec. Furthermore, the techniques may be fully implemented in one or more circuits or logic elements.

The embodiment of the present disclosure may be implemented in a wide variety of equipment or devices including a wireless handset, an integrated circuit (IC) or a set of ICs (e.g. a chipset). Various components, modules or units are described in embodiments of the present disclosure to emphasize functional aspects of an apparatus configured to perform the described techniques, but need not be implemented by different hardware units. Rather, as described above, the various units may be combined in a codec hardware unit or provided by a collection of interoperable hardware units (including one or more processors as described above) in combination with suitable software and/or firmware.

Those of ordinary skill in the art will appreciate that all or some of the operations, systems, functional modules/units of devices in the above disclosed methods may be implemented as software, firmware, hardware, and appropriate combinations thereof. In hardware embodiments, the division between functional modules/units mentioned in the above description does not necessarily correspond to the division of physical components. For example, a physical component may have multiple functions, or a function or step may be performed cooperatively by several physical components. Some or all of the components may be implemented as software executed by a processor, such as a digital signal processor or a microprocessor, or may be implemented as hardware, or may be implemented as an integrated circuit, such as an application specific integrated circuit. Such software may be distributed on computer-readable medium, which may include computer storage media (or non-transitory medium) and communication media (or transitory medium). As is well known to those of ordinary skill in the art, the term computer storage medium includes volatile and non-volatile, removable and non-removable medium implemented in any method or technique for storing information, such as computer-readable instructions, data structures, program modules, or other data. Computer storage medium include, but are not limited to, RAM, ROM, EEPROM, flash memory or other memory technology, CD-ROM, digital versatile disk (DVD) or other optical disk storage, magnetic cartridges, magnetic tapes, magnetic disk storage or other magnetic storage devices, or any other medium that may be used to store desired information and may be accessed by a computer. In addition, it is well known to those of ordinary skill in the art that communication medium typically contain computer readable instructions, data structures, program modules, or other data in modulated data signals such as carrier waves or other transmission mechanisms, and may include any information delivery medium.

The invention claimed is:

1. A residual encoding method, comprising:
in response to that a current picture is an inter predicted picture, determining whether a residual of a background area in the current picture needs to be compensated;

encoding first residual data in response to that the residual of the background area in the current picture needs to be compensated, and encoding second residual data in response to that the residual of the background area in the current picture does not need to be compensated;

wherein the first residual data is residual data of a whole picture of the current picture, and the second residual data is residual data of an object area in the current picture, and wherein determining whether the residual of the background area in the current picture needs to be compensated comprises: determining whether the residual of the background area in the current picture needs to be compensated according to at least one of an impact factor calculated for the current picture or an impact factor calculated for an encoded inter predicted picture in a same group of pictures; wherein the impact factors are determined based on a difference between a reconstructed picture with compensating the residual of the background area and a reconstructed picture without compensating the residual of the background area.

2. The residual encoding method of claim 1, wherein determining whether the residual of the background area in the current picture needs to be compensated comprises:

adding a predicted picture of the current picture and the second residual data to obtain a reference picture of the current picture;

calculating a similarity between an original picture and the reference picture of the current picture, and determining whether the similarity is less than a set first threshold value:

in response to that the similarity is less than the set first threshold value, determining that the residual of the background area in the current picture needs to be compensated;

in response to that the similarity is greater than or equal to the set first threshold value, determining that the residual of the background area in the current picture does not need to be compensated.

3. The residual encoding method of claim 1, wherein the method further comprises: in response to that the current picture is an earliest inter predicted picture after intra-coded (I) frame in a group of pictures, adding a predicted picture of the current picture and the second residual data to obtain a reference picture of the current picture; and performing a similarity calculation to obtain a similarity between an original picture and the reference picture of the current picture, and determining, according to the similarity, a difference Ns between picture serial numbers of two pictures for compensating the residual of the background area; and determining whether the residual of the background area in the current picture needs to be compensated comprises: determining that the residual of the background area in the current picture needs to be compensated in response to that a difference N between picture serial numbers of the current picture and a most recent inter predicted picture for compensating the residual of the background area or determining that the residual of the background area in the current picture needs to be compensated in response to that a difference N between picture serial numbers of the current picture and a most recent I frame is equal to Ns, where both N and Ns are positive integers.

4. The residual encoding method of claim 3, wherein:

determining whether the residual of the background area in the current picture needs to be compensated further comprises:

when N<Ns, determining that the residual of the background area in the current picture does not need to be compensated directly; or when N<Ns, determining whether a set residual compensation condition is satisfied, in response to that the set residual compensation condition is satisfied, determining that the residual of the background area in the current picture needs to be compensated, and in response to that the set residual compensation condition is not satisfied, determining that the residual of the background area in the current picture does not need to be compensated;

when N=Ns, re-performing a similarity calculation, and re-determining a difference Ns between picture serial numbers of two pictures for compensating the residual of the background region according to a calculated similarity.

5. The residual encoding method of claim 4, wherein when residual encoding is performed on each inter predicted picture, similarity calculation is performed to obtain a similarity; and the set residual compensation condition comprises at least one of the following:

a difference value obtained by subtracting a calculated similarity for the current picture from a calculated similarity for a previous picture is greater than a set second threshold value;

the calculated similarity for the current picture is less than a set third threshold value.

6. The residual encoding method of claim 3, wherein determining the difference Ns between picture serial numbers of two pictures for compensating the residual of the background area according to the similarity comprises:

determining a similarity range to which the similarity belongs; and searching corresponding relationships between preset similarity ranges and numbers of interval pictures according to the similarity range determined, and taking a searched number of interval pictures as Ns, wherein in the correspondences, a number of interval pictures which corresponds to a similarity range with a greater similarity in the preset similarity ranges is also larger; or obtaining Ns according to the similarity and a set equation, the set equation being used for calculating the number of interval pictures according to the similarity.

7. The residual encoding method of claim 1, wherein the method further comprises: setting residual data of other areas except the object area in the current picture to be equal to 0, and encoding the residual data of other areas except the object area in the current picture.

8. The residual encoding method of claim 1, wherein the residual data of the object area in the current picture is obtained through multiplying the first residual data by a first object mask, the first object mask being obtained by inputting an original picture of the current picture into an object segmentation network and performing binarization processing on a segmentation result; or the residual data of the object area in the current picture is obtained through multiplying the first residual data by a second object mask, the second object mask being obtained by performing dilation processing on the first object mask.

9. The residual encoding method of claim 8, wherein performing the dilation processing on the first object mask comprises: determining a dilation kernel used for the dilation processing, and performing the dilation processing on the first object mask by using the dilation kernel, wherein a size of the dilation kernel is positively correlated with a statistical shift value for pixels in the object area.

10. The residual encoding method of claim 9, wherein the dilation kernel is a square, and a side length $k_d$ of the square is calculated according to the following equation:

$$k_d = ceil(\max(D * M_O)) + k_0$$

wherein D is a matrix composed of shift values of pixels in the current picture, $M_O$ is the first object mask before the dilation processing, $k_0$ is a set constant, ceil( ) is a rounding up function, and max( ) is a function for taking a maximum value of elements in the matrix.

11. A non-transitory computer-readable medium, having stored thereon instructions and a bitstream, wherein the instructions, when executed by a processor, cause the processor to perform the method of claim 1 to generate the bitstream.

12. A video encoding method, wherein in response to that a current picture is an inter predicted picture, a predicted picture of the current picture is obtained through inter prediction calculation;

first residual data is calculated and obtained according to an original picture and the predicted picture of the current picture; and residual encoding is performed according to the following method:

in response to that a current picture is an inter predicted picture, determining whether a residual of a background area in the current picture needs to be compensated;

encoding first residual data in response to that the residual of the background area in the current picture needs to be compensated, and encoding second residual data in response to that the residual of the background area in the current picture does not need to be compensated;

wherein the first residual data is residual data of a whole picture of the current picture, and the second residual data is residual data of an object area in the current picture, and wherein determining whether the residual of the background area in the current picture needs to be compensated comprises: determining whether the residual of the background area in the current picture needs to be compensated according to at least one of an impact factor calculated for the current picture or an impact factor calculated for an encoded inter predicted picture in a same group of pictures; wherein the impact factors are determined based on a difference between a reconstructed picture with compensating the residual of the background area and a reconstructed picture without compensating the residual of the background area.

13. The video encoding method of claim 12, wherein the method further comprises: in response to that the current picture is an intra-coded (I) frame, encoding the original picture of the current picture by adopting a first code rate and a second code rate respectively to obtain an picture feature map of the first code rate and an picture feature map of the second code rate, wherein the first code rate is greater than the second code rate;

multiplying the picture feature map of the first code rate by a third object mask to obtain an object feature map; multiplying the picture feature map of the second code rate by a background mask to obtain a background feature map; and encoding the object feature map and the background feature map respectively;

wherein the third object mask and the background mask are obtained by inputting the original picture of the current picture into an object segmentation network and performing binarization processing on a segmentation result.

14. A video encoding device, comprising a processor and a memory storing a computer program executable by the processor, wherein the processor is configured to cause the video encoding device to implement, when running the computer program, the video encoding method of claim 12.

15. A residual encoding device, comprising a processor and a memory storing a computer program executable by the processor, wherein the processor is configured to cause the residual encoding device to implement, when running the computer program, operations of:

in response to that a current picture is an inter predicted picture, determining whether a residual of a background area in the current picture needs to be compensated;

encoding first residual data in response to that the residual of the background area in the current picture needs to be compensated, and encoding second residual data in response to that the residual of the background area in the current picture does not need to be compensated;

wherein the first residual data is residual data of a whole picture of the current picture, and the second residual data is residual data of an object area in the current picture, and wherein determining whether the residual of the background area in the current picture needs to be compensated comprises: determining whether the residual of the background area in the current picture needs to be compensated according to at least one of an impact factor calculated for the current picture or an impact factor calculated for an encoded inter predicted picture in a same group of pictures; wherein the impact factors are determined based on a difference between a reconstructed picture with compensating the residual of the background area and a reconstructed picture without compensating the residual of the background area.

16. The residual encoding device of claim 15, wherein determining whether the residual of the background area in the current picture needs to be compensated comprises:

adding a predicted picture of the current picture and the second residual data to obtain a reference picture of the current picture;

calculating a similarity between an original picture and the reference picture of the current picture, and determining whether the similarity is less than a set first threshold value:

in response to that the similarity is less than the set first threshold value, determining that the residual of the background area in the current picture needs to be compensated;

in response to that the similarity is greater than or equal to the set first threshold value, determining that the residual of the background area in the current picture does not need to be compensated.

17. The residual encoding device of claim 15, wherein the processor is further configured to cause the residual encoding device to implement operations of:

in response to that the current picture is an earliest inter predicted picture after intra-coded (I) frame in a group of pictures, adding a predicted picture of the current picture and the second residual data to obtain a reference picture of the current picture; and performing a similarity calculation to obtain a similarity between an original picture and the reference picture of the current picture, and determining, according to the similarity, a difference Ns between picture serial numbers of two pictures for compensating the residual of the background area; and determining whether the residual of the background area in the current picture needs to be compensated comprises: determining that the residual of the background area in the current picture needs to be compensated in response to that a difference N between picture serial numbers of the current picture and a most recent inter predicted picture for compensating the residual of the background area or determining that the residual of the background area in the current picture needs to be compensated in response to that a difference N between picture serial numbers of the current picture and a most recent I frame is equal to Ns, where both N and Ns are positive integers.

18. The residual encoding device of claim 15, wherein the residual data of the object area in the current picture is obtained through multiplying the first residual data by a first object mask, the first object mask being obtained by inputting an original picture of the current picture into an object segmentation network and performing binarization processing on a segmentation result; or the residual data of the object area in the current picture is obtained through multiplying the first residual data by a second object mask, the second object mask being obtained by performing dilation processing on the first object mask.

19. The residual encoding device of claim 18, wherein performing the dilation processing on the first object mask comprises: determining a dilation kernel used for the dilation processing, and performing the dilation processing on the first object mask by using the dilation kernel, wherein a size of the dilation kernel is positively correlated with a statistical shift value for pixels in the object area.

20. The residual encoding device of claim 19, wherein the dilation kernel is a square, and a side length $k_d$ of the square is calculated according to the following equation:

$$k_d = ceil(\max(D * M_O)) + k_0$$

wherein D is a matrix composed of shift values of pixels in the current picture, $M_O$ is the first object mask before the dilation processing, $k_0$ is a set constant, ceil( ) is a rounding up function, and max( ) is a function for taking a maximum value of elements in the matrix.

* * * * *